US008022866B2

(12) United States Patent
Goldberg et al.

(10) Patent No.: US 8,022,866 B2
(45) Date of Patent: Sep. 20, 2011

(54) METHOD AND SYSTEM FOR DOPPLER ESTIMATION

(75) Inventors: Jason Goldberg, Menlo Park, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/252,982

(22) Filed: Oct. 16, 2008

(65) Prior Publication Data

US 2010/0066605 A1    Mar. 18, 2010

Related U.S. Application Data

(60) Provisional application No. 61/097,755, filed on Sep. 17, 2008.

(51) Int. Cl.
*G01S 19/52* (2010.01)

(52) U.S. Cl. .................................... 342/357.35

(58) Field of Classification Search ............. 342/357.05, 342/357.35, 357.69, 357.75, 357.77, 357.78
See application file for complete search history.

(56) References Cited

U.S. PATENT DOCUMENTS

| | | | |
|---|---|---|---|
| 6,812,887 B2 * | 11/2004 | Syrjarinne et al. | 342/357.12 |
| 6,819,707 B2 | 11/2004 | Abraham et al. | |
| 7,173,992 B2 * | 2/2007 | Frigon | 375/354 |
| 7,605,665 B2 * | 10/2009 | Chambers et al. | 331/16 |
| 2009/0287437 A1 * | 11/2009 | Turner | 702/75 |

OTHER PUBLICATIONS

Ballantyne et al. Power Down: Achieving Low Energy-Per-Fix in Cell Phones; GPS World; Jul. 1, 2006. http://uc.gpsworld.com/gpsuc/Personal+Tracking/PowerDown/ArticleStandard/Article/detail/364979.

* cited by examiner

*Primary Examiner* — Thomas H Tarcza
*Assistant Examiner* — Cassi Galt
(74) *Attorney, Agent, or Firm* — McAndrews, Held & Malloy, Ltd.

(57) ABSTRACT

Aspects of a method and system for Doppler estimation may include generating, in a GNSS receiver operating in a duty-cycle mode, a plurality of lag-m products that may be based on a plurality of correlation coefficients corresponding to one or more received signals, wherein the plurality of correlation coefficients may be generated during an active period of the duty-cycle mode of operation. A Doppler frequency may be estimated based on the plurality of lag-m products. The GNSS receiver may be compliant with one or more standards comprising GALILEO, GLONASS, IRNSS, and BEIDOU. The active period of the duty-cycle mode may be chosen arbitrarily from a range of 1% to 99%.

22 Claims, 5 Drawing Sheets

METHOD AND SYSTEM FOR DOPPLER ESTIMATION

CROSS-REFERENCE TO RELATED APPLICATIONS/INCORPORATION BY REFERENCE

This application makes reference to, claims priority to, and claims the benefit of U.S. Provisional Application Ser. No. 61/097,755, filed on Sep. 17, 2008.

The above referenced application is hereby incorporated herein by reference in its entirety.

FIELD OF THE INVENTION

Certain embodiments of the invention relate to signal processing for satellite navigation systems. More specifically, certain embodiments of the invention relate to a method and system for Doppler estimation.

BACKGROUND OF THE INVENTION

Global Navigation satellite systems (GNSS) receivers may normally determine their position by receiving satellite broadcast signals from a plurality of satellites. These satellites, for example 24 at any time for the Global Positioning System (GPS), may broadcast radio frequency signals that comprise information that may be exploited by the satellite receiver to determine its own position. By measuring the time the broadcast signals may travel from the satellites to the satellite receiver, and the known position of the transmitting satellite, the satellite receiver may be able to determine its own position by trilateration. In general, at least 3 satellite signals may need to be decoded at the satellite receiver in order to determine its position.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for Doppler estimation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Doppler estimation. Aspects of a method and system for Doppler estimation may comprise generating, in a GNSS receiver operating in a duty-cycle mode, a plurality of lag-m products that may be based on a plurality of correlation coefficients corresponding to one or more received signals, wherein the plurality of correlation coefficients may be generated during an active period of the duty-cycle mode of operation. A Doppler frequency may be estimated based on the plurality of lag-m products.

The GNSS receiver may be compliant with one or more standards comprising GALILEO, GLONASS, IRNSS, and BEIDOU. The active period of the duty-cycle mode may be chosen arbitrarily from a range of 1% to 99%. The plurality of lag-m products may correspond to the one or more received signals utilizing a relationship:

$$R_i = C_i C_{i-1}^*$$

where $R_i$ may denote a lag-1 product at a time index i, $C_i$ may denote a correlation coefficient at a time index i, and .* may denote complex conjugation. The plurality of correlation coefficients may be generated by correlating a sampled received baseband signal corresponding to at least one of the one or more received signals with a local copy of a coarse acquisition (CA) code. The Doppler frequency may be estimated by averaging the plurality of lag-m products, and taking an argument of the average. The averaged plurality of lag-m products may be scaled for the estimation of the Doppler frequency. The plurality of correlation coefficients may be frequency-compensated via a first Doppler frequency estimate before forming the plurality of lag-m products. An argument of a complex quantity may be taken for the estimating of the Doppler frequency. The argument of the complex quantity may be approximated by an imaginary signal component of the complex quantity. The argument of the complex quantity may be approximated by an arbitrary numerical method. The Doppler frequency may be estimated utilizing iterative estimation.

Figure 1:
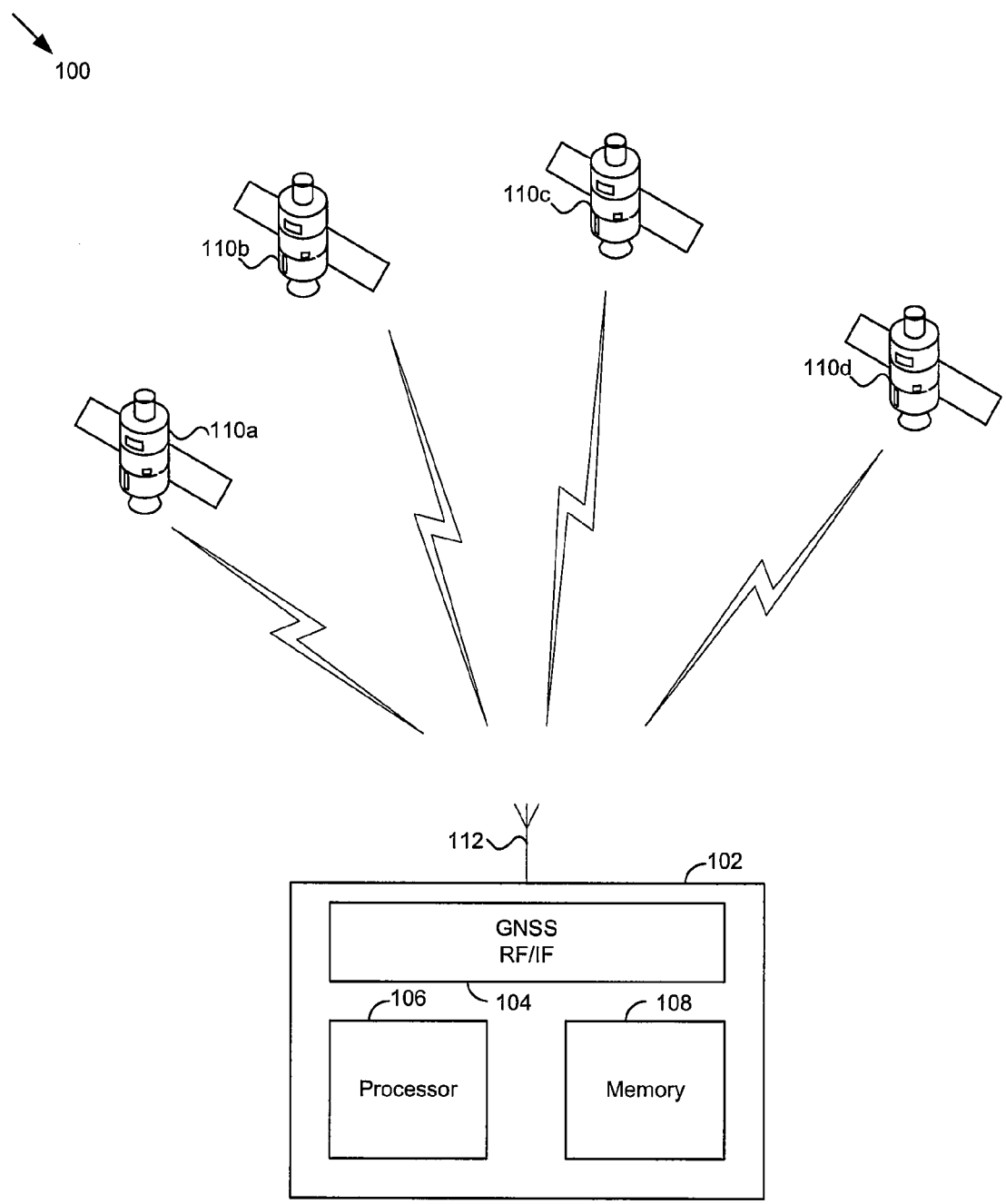
FIG. 1 is a diagram illustrating an exemplary satellite navigation system, in accordance with an embodiment of the invention.

FIG. 1 is a diagram illustrating an exemplary satellite navigation system, in accordance with an embodiment of the invention. Referring to FIG. 1, there is shown a satellite navigation system 100, comprising a satellite receiver 102 and a plurality of satellites, of which satellites 110a, 110b, 110c, 110d may be illustrated. The satellite receiver 102 may be communicatively coupled to a receiver antenna 112. The satellite receiver 102 may comprise a Global Navigation Satellite System (GNSS) radio-frequency (RF) and intermediate-frequency (IF) front-end 104, a processor 106 and memory 108.

The satellites 110a through 110d may comprise suitable logic, circuitry and/or code that may be enabled to generate and broadcast suitable radio-frequency signals that may be received by a satellite receiver, for example satellite receiver 102, to determine the satellite receiver 102 position. The satellite receiver 102 may comprise suitable logic, circuitry and/or code that may be enabled to receive signals broadcasted from satellites, for example satellites 110a through 110d, and process the received signals to determine the position of the satellite receiver 102. The GNSS RF/IF front-end 104 may comprise suitable logic, circuitry and/or code that may be enabled to receive satellite broadcast signals via receiver antenna 112 and process them in a desirable fashion to generate baseband signals, which may be suitable for further processing in the satellite receiver 102 and the processor 106. The memory 108 may comprise suitable logic, circuitry and/or code that may enable storage and access to data and code suitable for the operations performed by the satellite receiver 102 and the processor 106.

In FIG. 1, an exemplary satellite navigation scenario may be illustrated, wherein a satellite receiver 102 may receive a plurality of satellite signal from which the satellite receiver 102 may be able to extract information that may enable the satellite receiver to determine its position. The satellite receiver 102 and the satellites, for example satellites 110a through 110d, may be operating in compliance with the Global Positioning System (GPS) developed and operated by the United States of America Department of Defense. In accordance with various embodiments of the invention, the invention may not be limited to application in GPS and may be applied to other GNSS systems, for example GALILEO, GLONASS, IRNSS, and BEIDOU.

Figure 2:
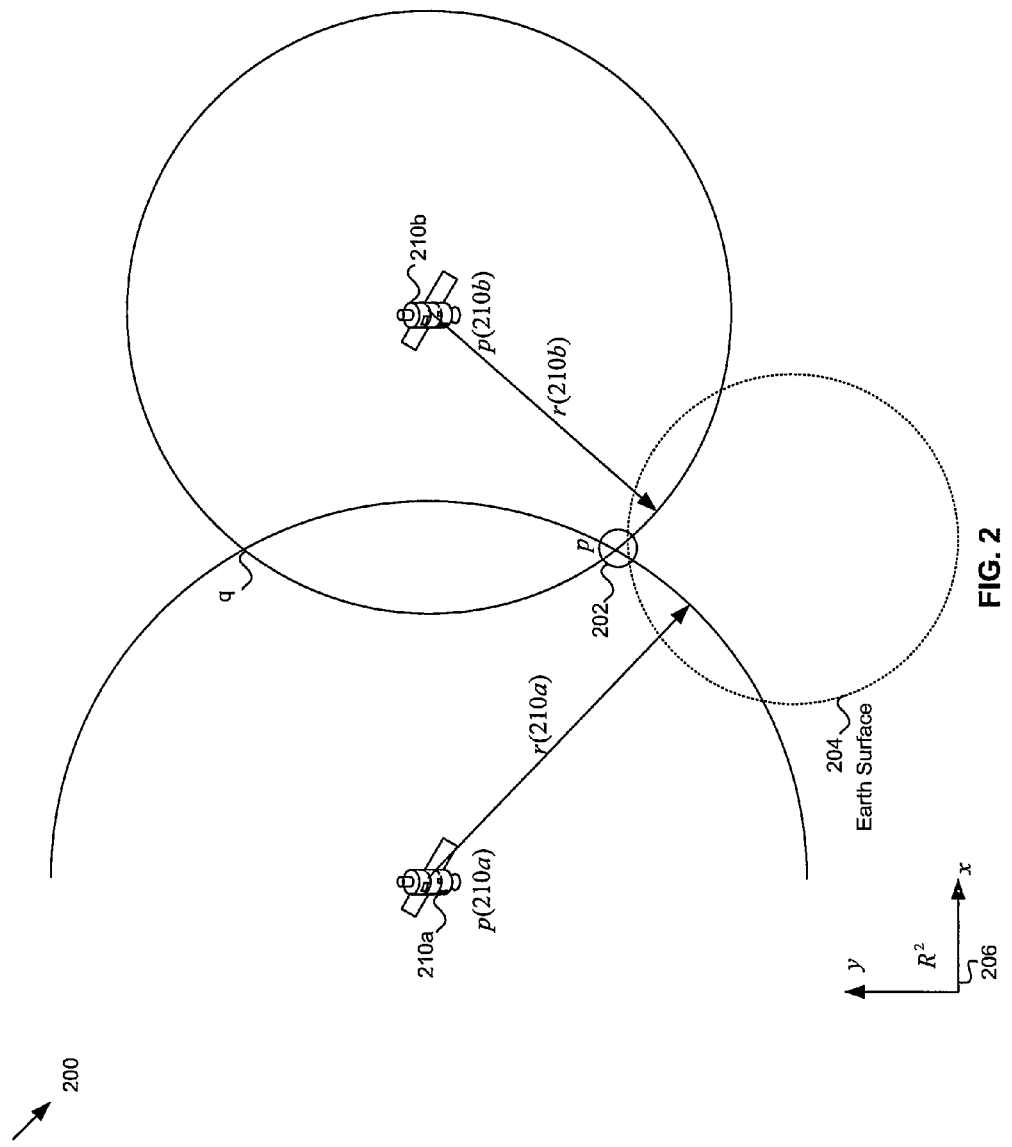
FIG. 2 is a diagram illustrating an exemplary satellite navigation system in a two-dimensional setting, in accordance with an embodiment of the invention.

FIG. 2 is a diagram illustrating an exemplary satellite navigation system in a two-dimensional setting, in accordance with an embodiment of the invention. Referring to FIG. 2, there is shown a satellite navigation system 200, comprising a receiver 202 (illustrated by a small circle) at position p, satellites 210a and 210b, an earth surface 203 illustrated by a dotted circle, and an exemplary coordinate system 206. The exemplary coordinate system 206 may be a two-dimensional coordinate system in $R^2$, spanned by the unit vectors x and y, and where R may denote the set of real numbers and $R^n$ denotes a n-dimensional space with real coordinates. There is also shown a position of satellite 210a in $R^2$ denoted p(210a), a position of satellite 210b denoted p(210b), an intersection point q, a range from satellite 210a to the satellite receiver 202 r(210a) and a range from satellite 210b to the satellite receiver 202 r(210b).

To illustrate the principles involved in determining a position of the receiver 202 from the satellites, for example the satellites 210a and 210b, it may be useful to consider a two-dimensional scenario as illustrated in FIG. 2. The three-dimensional case encountered in reality may be considered an extension to three dimensions of the principles demonstrated in the two-dimensional case. As illustrated in FIG. 2, the principle of determining the position p of the satellite receiver 202 may be to measure the range from the satellite receiver 202 to a plurality of satellites, for example r(210a) and r(210b), based on the known positions of the satellites, for example p(210a) and p(210b). Based on the measured ranges from the satellites 210a and 210b to the satellite receiver 202 and the known position of the satellites, each satellite may define a circle (in $R^2$) of positions that lie at a given range from the satellite, as illustrated in FIG. 2. In the case of two satellites, there may be two intersection points: one may be the desired position p and the other may be the intersection q. As may be observed from FIG. 2, only p may be close to the surface of the earth. Hence, only p may be a feasible solution for the position of the satellite receiver 202. In three dimensions, the circles around the satellites may become spheres and the intersection of two spheres may generate a circle of feasible solutions. Therefore, in the three dimensional case, the solution may require 1 more satellite to resolve the extra dimension.

In addition to position measurements as described above, a receiver 202 may use Doppler measurements to derive high quality speed, and directional heading information from the received satellite signals. Speed and directional heading may be combined to form a velocity vector, which may be desirable in navigation applications that may depend heavily on vehicle directional information.

Figure 3:
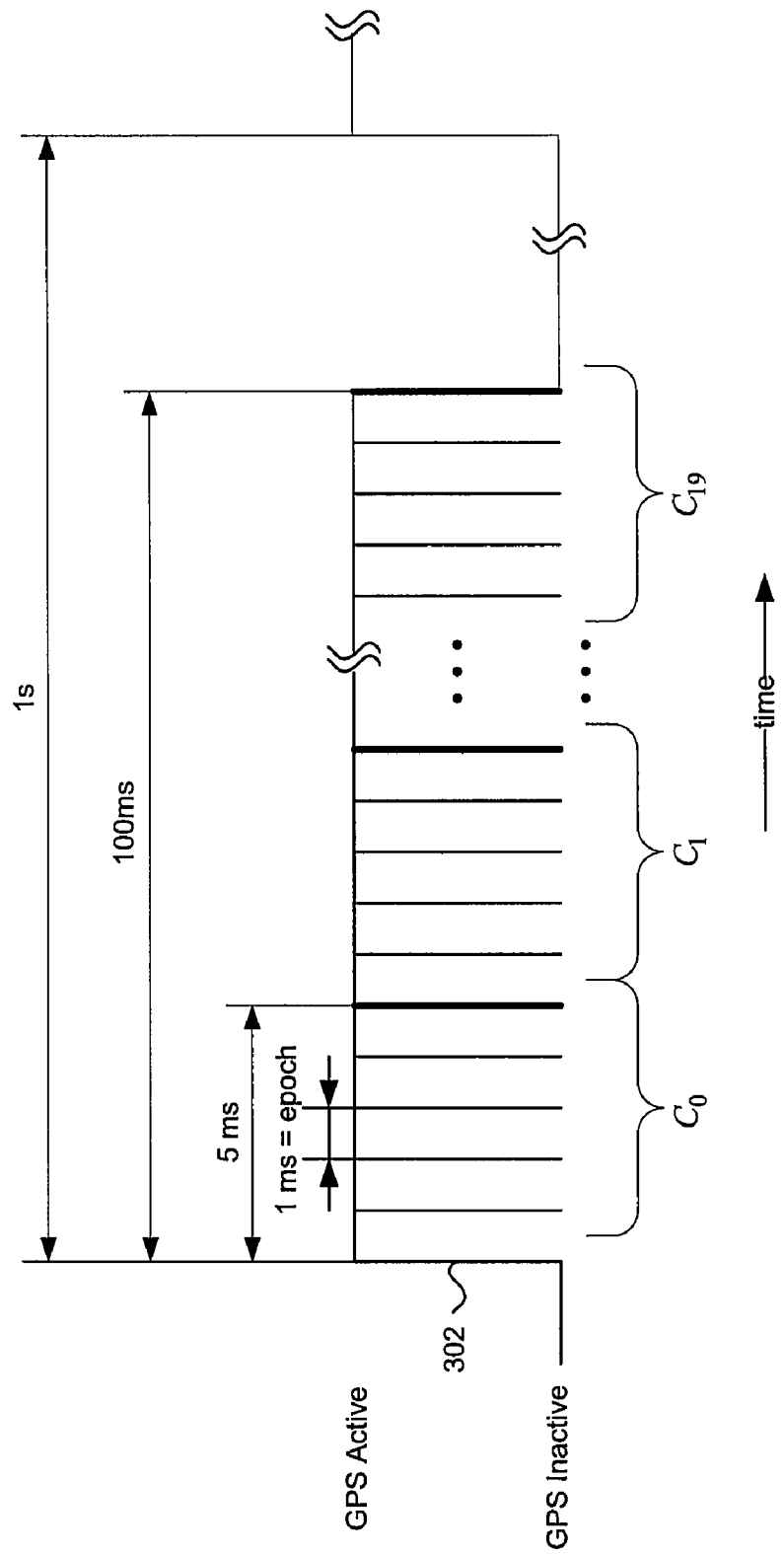
FIG. 3 is a diagram illustrating a GPS receiver duty-cycle operation mode, in accordance with an embodiment of the invention.

FIG. 3 is a diagram illustrating a GPS receiver duty-cycle operation mode, in accordance with an embodiment of the invention. Referring to FIG. 3, there is shown a horizontal time axis, and a vertical axis illustrating GPS inactive and GPS active levels. An activity level 302 illustrates the GPS receiver activity level as a function of time. As shown in FIG. 3, in accordance with an embodiment of the invention, the GPS receiver may be active for a duration of about 100 ms, followed by a period of inactivity for a duration of about 900 ms, before switching to a period of activity. Thus, the exemplary embodiment may illustrate a 1 second cycle, with a 10% (100 ms) active duty-cycle. The active period may be further subdivided into 1 ms epochs. The exemplary 5 ms intervals may comprise 5 epochs, and may be illustrated by bold lines. There are also shown exemplary correlation coefficients $C_0, \ldots, C_{19}$. The duty-cycle mode may comprise any activity period, and may not be limited to a 100 ms activity period, as illustrated. The period of activity may be between 1% and 99%. Similarly, the 1 ms epochs, the 1 s cycle, the 5 ms intervals may be arbitrarily chosen.

To minimize power consumption, it may be desirable to operate the GPS receiver in a duty-cycle mode, as illustrated with respect to, for example, FIG. 3. During the active period, a GPS receiver may receive, amplify and/or downconvert the radio-frequency (RF) satellite signals, and sample them, for example. The sampled received satellite signal at baseband may comprise data bits that may be transmitted in the form of a code-division spread spectrum signal. The spreading signal may generally comprise a substantially higher frequency than the data signal, and may be a spreading code. These finite-length spreading signals may be referred to as CA (coarse acquisition) codes. For example, a CA code period may be 1 ms in duration.

At the GPS receiver, a Doppler frequency may be estimated by correlating the sampled received baseband signal with a locally generated baseband CA code. In an exemplary embodiment of the invention, a correlation may be obtained coherently by correlating over a 5 ms interval, as illustrated with respect to FIG. 3. Thus, a correlation output may be generated every 5 ms, for example $C_0$ through $C_{19}$, during an exemplary 100 ms active period. A correlator output may be modeled as a sampled complex sinusoid, for example, using the following relationship:

$$C_i = A e^{j\omega iT},$$

where the complex sinusoid may be sampled at t=iT, A may be a slowly changing signal amplitude, and $\omega=2\pi f$ may be the angular frequency representation of the Doppler frequency f. In some instances, the signal amplitude A may be complex, and may comprise a phase and/or modulated data. In accordance with various embodiments of the invention, the Doppler frequency may be estimated from the correlator outputs $\{C_i\}$.

In instances when a GPS receiver may operate in a 100% duty-cycle mode, the GPS receiver may employ a frequency tracking circuit to maintain an estimate of the Doppler frequency $\omega$, for example a frequency-locked loop (FLL). However, for a duty-cycle mode, an FLL may not be desirable as the relatively long periods of inactivity may render the FLL unstable, and may lead to undesirable transient effects. Thus, it may be desirable to operate a Doppler frequency estimator based on blocks of data, for example $C_0, \ldots, C_{19}$, which may be obtained during the active period of a cycle.

In accordance with various embodiments of the invention, a lag-m product, $R_i$, may be generated, as defined by the following relationship:

$$R_i = C_i C_{i-m}^*$$

$$\Omega_i = \arg(R_i) = \angle(A^2 e^{j\omega iT} e^{-j\omega(i-m)T}) = m\omega T$$

where arg(.) may be the argument function, which may determine the angle of a complex number. Thus, it may be observed that the argument of the lag-m product $R_i$ may be proportional to the angular Doppler frequency $\omega$.

Since noise may corrupt the correlation coefficients, it may be desirable to form an average, which may reduce the noise effect on the Doppler frequency estimate. For example, in accordance with an embodiment of the invention, the angular Doppler frequency estimate, $\hat{\omega}$, may be generated as defined by the following relationship:

$$\hat{\omega} = \frac{1}{mT} \arg\left(\frac{1}{N} \sum_{i=1}^{N} b_i R_i\right) \quad (1)$$

where N may denote the most recent $C_i \in \{0, \ldots, N\}$, and $b_i$ may denote weighting coefficients. For example, N=19, as described above. In accordance with various embodiments of the invention, the angular frequency estimate may be generated alternatively from averaging weighted angles $\Omega_i$, for example:

$$\hat{\omega} = \frac{1}{mT}\left(\frac{1}{N} \sum_{i=1}^{N} b_i \Omega_i\right)$$

Furthermore, any frequency estimation techniques based on lag-m products $R_i$ may be used. For example, lag-m products based on $\{C_i\}$ obtained during active periods (or blocks) in duty-cycle operation mode, may be used. Such techniques may comprise, for example, weighted averages achieved by the weighting coefficients $\{b_i\}$. In many instance, it may be desirable to choose m=1, and $\{b_i\}=1$, $\forall i$.

In some instances, it may be desirable to increase estimation accuracy by compensating the correlation coefficients with a first Doppler frequency estimate. In many instances, by increasing the coherent correlation time used to generate the correlation coefficients $\{C_i\}$, an estimation error may be reduced at the expense of the estimator frequency range: For a fixed-duration active period, and fixed epoch time, increasing the coherent integration interval may lead to fewer correlation coefficients $\{C_i\}$ in an active period. However, because the correlation coefficients may be computed over more epochs compared to shorter coherent integration intervals, the correlation coefficients $\{C_i\}$ may be less noisy, leading to less noisy lag-m products $R_i$. Because less correlation coefficients $\{C_i\}$ may represent an active period, the sampling theorem may impose a trade-off between frequency range (increased frequency range requires more coefficients $\{C_i\}$), and estimation quality (longer coherent integration intervals result in less noise in the correlation coefficients).

The significance of this trade-off may be reduced by heterodyning the correlation coefficients with a complex tone, which may be determined from a first Doppler estimate. In some instances, such an approach may be implemented via an iterative algorithm. For example, the Doppler frequency may be $\omega = \hat{\omega}_1 + \epsilon_1$, where $\hat{\omega}_1$ may be a first estimate of the Doppler frequency, and $\epsilon_1 \ll \hat{\omega}_1$ may be an associated error term.

Using the first estimate of the Doppler frequency, compensated correlation coefficients $\{\tilde{C}_i\}$ may be generated utilizing, for example, the following relationship:

$$\tilde{C}_i = e^{-j\hat{\omega}_1 iT} C_i = A e^{-j\hat{\omega}_1 iT} e^{j(1+\epsilon_1)iT} = A e^{j\epsilon_1 iT}$$

where a noise term has been omitted. Thus, it may be seen that the compensated correlation coefficients may be a function of the error term only, and thus the error term may be estimated as described above. Because $\epsilon_1 \ll \hat{\omega}_1$, the required frequency range of the estimator may be reduced, and the coherent integration interval may be increased (N may be reduced) to obtain less noisy correlation coefficients $C_i$. Thus, the angular Doppler frequency estimate may be given by the following relationship, for example:

$$\hat{\omega} = \hat{\omega}_1 + \epsilon_1$$

$$= \hat{\omega}_1 + \frac{1}{mT} \arg\left(\frac{1}{N} \sum_{i=1}^{N} b_i \tilde{C}_i \tilde{C}_{i-m}^*\right)$$

Similarly, the estimate $\epsilon_1$ may be obtained via an arbitrary estimation technique, based on processing correlation coefficients and/or compensated correlation coefficients. Therefore, it may be desirable to initiate the estimation process with a shorter coherence interval to obtain a fast coarse frequency estimate, and then increase the coherent integration interval to obtain a refined frequency estimate.

The arg(.) operation used in the above description to obtain the angle of a complex quantity may be a non-linear operation, and may involve an arctangent operation. Thus, it may be desirable to approximate the arg(.) operation by a linear operation in some instances. In some instances, an exemplary iterative approach described above may aid in reducing approximation errors, because a residual error term $\epsilon_1$ may decrease with the number of iterations, and approach zero. For small angular values of the estimated quantity, that is $\omega T$ or $\epsilon_1 T$, the argument function may be approximated by $\arg(x) \approx \text{Im}\{x\}$, where $\text{Im}\{x\}$ may denote the imaginary part of a complex quantity x. For example, $\text{Im}\{R_i\} \approx A^2 \omega T$, because for $x \ll 1$, $\sin(x) \approx x$.

The spreading codes, or CA codes, of the received signal may be modulated with data signals, for example BPSK-modulated. Thus, it may be possible that the amplitude of a correlation coefficient $C_i$ may be determined in part by a data bit $b[n] \in \{+1, -1\}$, and may lead to $A \in \{+a, -a\}$ (neglecting noise). Thus, when forming lag-m products, and averaging, care may have to be taken that consecutive $C_i$ may not cancel each other. This may be the case when $C_i$ and $C_{i+m}$ may be determined across a bit transition, where a first data bit associated with $C_i$ may be different from a second data bit associated with $C_{i+m}$. In these cases, it may be desirable to either compensate for the data bit and/or average correlation coefficients $\{C_i\}$ that may be associated with a similar data bit and/or data bits of a same modulation value. In some instances, it may be desirable to exclude lag-m products $R_i$ from the Doppler frequency estimation when they may be based on correlation coefficients obtained from locations of potential bit transitions. For example, in accordance with an exemplary embodiment of the invention, if data bit transitions may occur every 20 ms, and correlation coefficients may be obtained every 5 ms, thus 3 out of 4 generated lag-1 (m=1) products over a 20 ms window may occur at times without bit transitions. The lag-m product straddling the transition may be excluded from the Doppler frequency estimate. The position of possible bit transitions may be known when a GPS receiver may be operating in a tracking mode.

Figure 4:
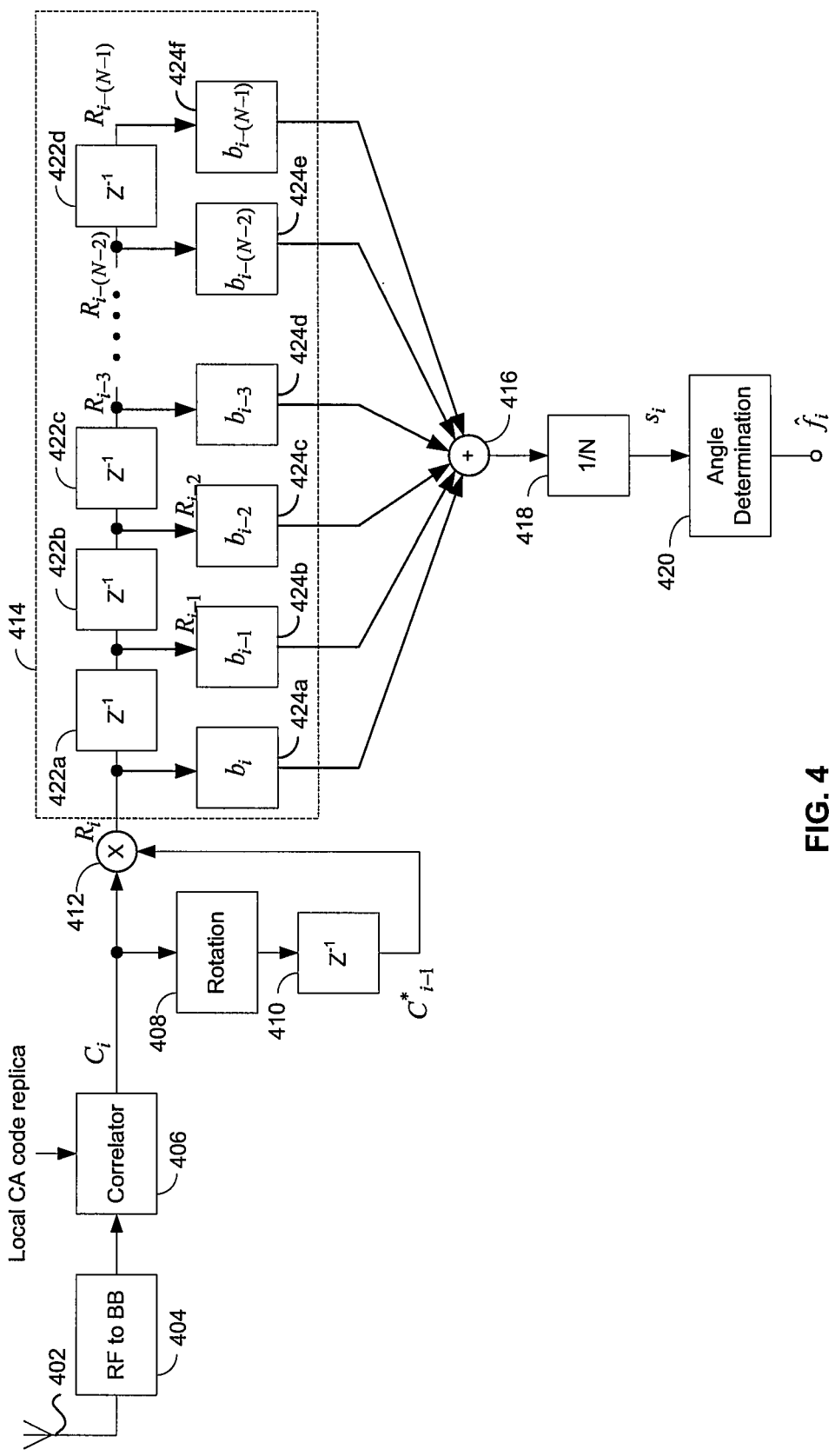
FIG. 4 is a diagram of an exemplary frequency estimator, in accordance with an embodiment of the invention.

FIG. 4 is a diagram of an exemplary frequency estimator, in accordance with an embodiment of the invention. Referring to FIG. 4, there is shown an antenna 402, a radio-frequency (RF) to baseband (BB) processing chain 404, a correlator 406, a rotation block 408, a delay block 410, a multiplier 412, a memory 414, an adder 416, a dividing block 418, and an angle determination block 420. The memory 414 may comprise one or more delay blocks, of which delay blocks 422a, 422b, 422c, and 422d may be illustrated. Moreover, the memory 414 may comprise a plurality of weighting modules, of which weighting modules 424a, 424b, 424c, 424d, 424e, and 424f may be illustrated. There are also shown correlator coefficients $C_i$, complex conjugate, delayed correlation coefficients $C_{i-1}^*$, lag-1 (m=1) products $R_{i-n}$, with delay n, and averaged signal $s_i$, and a Doppler frequency estimate $\hat{f}_i$. In some instances, FIG. 4 may be adapted to a general lag-m system.

The antenna 402 may comprise suitable logic, circuitry and/or code that may be enabled to receive radio-frequency waves and convert them to electrical signals. The RF to BB processing chain 404 may comprise suitable logic, circuitry and/or code that may be enabled to convert a radio-frequency signal at its input to an output baseband signal. The RF to BB processing chain 404 may comprise, for example, one or more filters, demodulation and/or downconversion, and sampling, which may be enabled to extract a baseband signal from a radio-frequency signal, via an intermediate frequency signal, for example.

The correlator 406 may comprise suitable logic, circuitry and/or code that may be enabled to generate an output signal which may be proportional to the cross-correlation of a plurality of input signals. The input and output signals may be analog and/or digital. The output of the correlator 406 may be a correlation coefficient signal $C_i$, for example. The rotation block 408 may comprise suitable logic, circuitry and/or code that may be enabled to generate a complex output signal, which may be a rotated version of a complex input signal.

The delay blocks 410, and 422a through 422d may be substantially similar, and may each comprise suitable logic, circuitry and/or code that may be enabled to delay an input signal by one or more sampling periods. The multiplier 412 may comprise suitable logic, circuitry and/or code that may be enabled to generate an output signal that may be proportional to the product of a plurality of input signals. The adder 416 may comprise suitable logic, circuitry and/or code that may be enabled to generate an output signal that may be proportional to the sum of a plurality of input signals. The dividing block 418 may comprise suitable logic, circuitry and/or code that may be enabled to scale an input signal. The angle determination block 420 may comprise suitable logic, circuitry and/or code that may be enabled to generate an output that may be a function of the angle of its input signal, wherein the input signal may generally be complex. The memory 414 may comprise suitable logic, circuitry and/or code that may be enabled to retain and recall several signals for some time period. The weighting module 424a may comprise suitable logic, circuitry and/or code that may be enabled to scale an input signal.

The exemplary Doppler frequency estimation of FIG. 4 may correspond to the estimation technique described for FIG. 3, and equation (1). A GNSS signal, for example a GPS signal, may be received at the antenna 402 and may be communicated to the RF to BB processing chain 404, for conversion to baseband and sampling. The sampled received signal may be communicated to the correlator 406, where it may be correlated with a local CA code replica. The output of the correlator 406 may comprise correlation coefficients $\{C_i\}$. The correlation coefficients may, for example, be computed over 5 epochs, as described for FIG. 3. The rotation block 408 may perform a complex rotation, so that it's output may be the complex conjugate of its input. Thus, the output of the rotation block 408 may be $C_i^*$.

The delay block 410 may delay the complex conjugate $C_i^*$ by one sample period, for example, and thus generate $C_{i-1}^*$. The output of the delay block 410 and $C_i$ may be multiplied in the multiplier 412 to generate a lag-1 product $R_i = C_i C_{i-1}^*$. The memory 414 comprising the delay blocks 422a through 422d, for example, may be implemented as a shift-register, and may be used to store N lag-1 products $\{R_i, \ldots, R_{i-(N-1)}\}$. As per equation (1), the weighted lag-1 products $\{R_i, \ldots, R_{i-(N-1)}\}$ may be summed in adder 416, and averaged by the dividing block 418, to generate the output signal of the dividing block 418, given by the following relationship, for example:

$$s_i = \frac{1}{N} \sum_{k=i-(N-1)}^{N} b_k R_k$$

As described for FIG. 3, the Doppler frequency estimate may be obtained from the weighted and averaged lag-1 product $s_i$, for example by the following relationship, according to equation (1):

$$\hat{f}_i = \frac{1}{2\pi T} \arg(s_i)$$

In instances where the argument function may be approximated by the imaginary signal component, the following relationship may be used to estimate the Doppler frequency, as described for FIG. 3:

$$\hat{f}_i = \frac{1}{A^2 2\pi T} \text{Im}(s_i)$$

In accordance with various embodiments of the invention, the averaging functionality that may be provided by the memory 414 comprising the delay blocks 422a through 422d, the adder 416, and the dividing block 418, may be implemented by a moving average block, which may reduce memory requirements, for instance.

Figure 5:
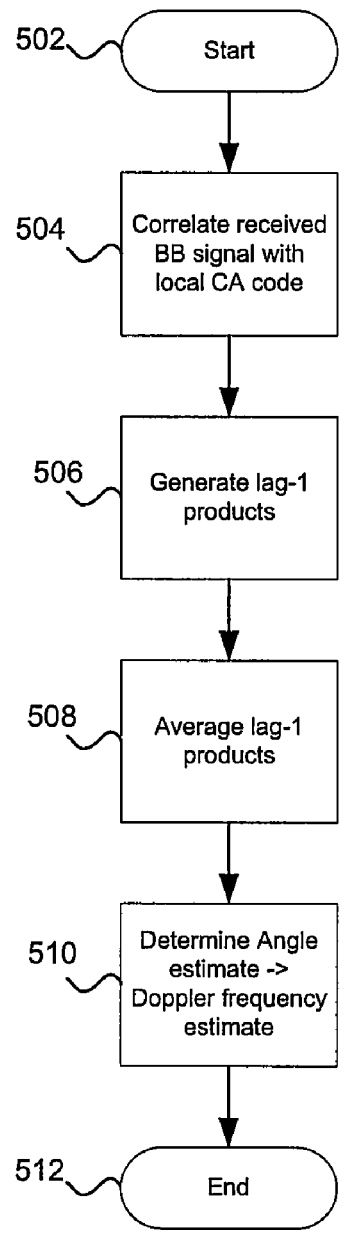
FIG. 5 is a flow chart illustrating an exemplary Doppler frequency estimation, in accordance with various embodiments of the invention.

FIG. 5 is a flow chart illustrating an exemplary Doppler frequency estimation, in accordance with various embodiments of the invention. The algorithm may be initialized in step 502. In step 504, the sampled received baseband signal may be correlated with a local copy of the CA code in the correlator 406, for example, to generate the correlation coefficients $C_i$. In step 506, lag-1 products $R_i$ may be formed from the generated correlation coefficients, for example $C_i$, and delayed and conjugated correlation coefficients, for example $C_i^*$. In step 508, the lag-1 products may be averaged. In some instances, in accordance with various embodiments of the invention, a lag-m product for an arbitrary integer m may be generated. In step 510, an estimate of the Doppler frequency, $\hat{f}$ or $\hat{\omega}$, may be determined, for example, via scaling of the argument of the averaged lag-m products.

In accordance with an embodiment of the invention, a method and system for Doppler estimation may comprise generating, in a GNSS receiver, for example satellite receiver 102, operating in a duty-cycle mode, a plurality of lag-m products $R_i$ that may be based on a plurality of correlation coefficients $C_i$ corresponding to one or more received signals, wherein the plurality of correlation coefficients may be generated during an active period of the duty-cycle mode of operation, as described for FIG. 1 to FIG. 5. A Doppler frequency may be estimated based on the plurality of lag-m products.

The GNSS receiver may be compliant with one or more standards comprising GALILEO, GLONASS, IRNSS, and BEIDOU, as described for FIG. 1. The active period of the duty-cycle mode may be chosen arbitrarily from a range of 1% to 99%, as illustrated with regard to FIG. 3. The plurality of lag-m products may correspond to the one or more received signals utilizing a relationship:

$$R_i = C_i C_{i-1}^*$$

where $R_i$ may denote a lag-1 product at a time index i, $C_i$ may denote a correlation coefficient at a time index i, and .* may denote complex conjugation. The plurality of correlation coefficients $C_i$ may be generated by correlating a sampled received baseband signal corresponding to at least one of the one or more received signals with a local copy of a coarse acquisition (CA) code, as described for FIG. 4. The Doppler frequency, for example f, may be estimated by averaging the plurality of lag-m products, and taking an argument of the average, as illustrated in FIG. 4. The averaged plurality of lag-m products may be scaled for the estimation of the Doppler frequency, for example in dividing block 418. The plurality of correlation coefficients may be frequency-compensated via a first Doppler frequency estimate before forming the plurality of lag-m products, as described in FIG. 4. An argument of a complex quantity may be taken for the estimating of the Doppler frequency. The argument of the complex quantity may be approximated by an imaginary signal component of the complex quantity. The argument of the complex quantity may be approximated by an arbitrary numerical method. The Doppler frequency may be estimated utilizing iterative estimation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Doppler estimation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing satellite signals, the method comprising:
generating in a GNSS receiver operating in a duty-cycle mode, a plurality of lag-m products based on a plurality of correlation coefficients corresponding to one or more received signals, wherein said plurality of correlation coefficients are generated from blocks of data during an active period of said duty-cycle mode of operation; and
estimating a Doppler frequency iteratively based on said plurality of lag-m products.

2. The method according to claim 1, wherein said GNSS receiver is compliant with one or more standards comprising GALILEO, GLONASS, IRNSS, and BEIDOU.

3. The method according to claim 1, wherein said active period of said duty-cycle mode is chosen arbitrarily from a range of 1% to 99%.

4. The method according to claim 1, comprising generating said plurality of lag-m products corresponding to said one or more received signals utilizing a relationship:

$$R_i = C_i C_{i-1}^*,$$

where $R_i$ denotes a lag-1 product at a time index i, $C_i$ denotes a correlation coefficient at a time index i, and .* denotes complex conjugation.

5. The method according to claim 1, comprising generating said plurality of correlation coefficients by correlating a sampled received baseband signal corresponding to at least one of said one or more received signals with a local copy of a coarse acquisition (CA) code.

6. The method according to claim 1, comprising estimating said Doppler frequency by averaging said plurality of lag-m products, and taking an argument of said average.

7. The method according to claim 6, comprising scaling said averaged plurality of lag-m products for said estimation of said Doppler frequency.

8. The method according to claim 1, comprising iteratively estimating said Doppler frequency by frequency-compensating said plurality of correlation coefficients via a first Doppler frequency estimate before forming said plurality of lag-m products.

9. The method according to claim 1, comprising taking an argument of a complex quantity for said estimating of said Doppler frequency.

10. The method according to claim 9, comprising approximating said argument of said complex quantity by an imaginary signal component of said complex quantity.

11. The method according to claim 9, comprising approximating said argument of said complex quantity by an arbitrary numerical method.

12. A system for processing satellite signals, the system comprising:
one or more circuits in a GNSS receiver that operates in a duty-cycle mode, wherein said one or more circuits are operable to:
generate a plurality of lag-m products based on a plurality of correlation coefficients corresponding to one or more received signal, wherein said plurality of correlation coefficients are generated from blocks of data during an active period of said duty-cycle mode of operation; and
estimate a Doppler frequency iteratively based on said plurality of lag-m products.

13. The system according to claim 12, wherein said GNSS receiver is compliant with one or more standards comprising GALILEO, GLONASS, IRNSS, and BEIDOU.

14. The system according to claim 12, wherein said active period of said duty-cycle mode is chosen arbitrarily from a range of 1% to 99%.

15. The system according to claim 12, wherein said one or more circuits generate said plurality of lag-m products corresponding to said one or more received signals utilizing a relationship:

$$R_i = C_i C_{i-1}^*,$$

where $R_i$ denotes a lag-1 product at a time index i, $C_i$ denotes a correlation coefficient at a time index i, and .* denotes complex conjugation.

16. The system according to claim 12, wherein said one or more circuits generate said plurality of correlation coefficients by correlating a sampled received baseband signal corresponding to at least one of said one or more received signals with a local copy of a coarse acquisition (CA) code.

17. The system according to claim 12, wherein said one or more circuits estimate said Doppler frequency by averaging said plurality of lag-m products, and taking an argument of said average.

18. The system according to claim 17, wherein said one or more circuits scale said averaged plurality of lag-m products for said estimation of said Doppler frequency.

19. The system according to claim 12, wherein said one or more circuits iteratively estimate said Doppler frequency by frequency-compensating said plurality of correlation coefficients via a first Doppler frequency estimate before forming said plurality of lag-m products.

20. The system according to claim 12, wherein said one or more circuits take an argument of a complex quantity for said estimating of said Doppler frequency.

21. The system according to claim 20, wherein said one or more circuits approximate said argument of said complex quantity by an imaginary signal component of said complex quantity.

22. The system according to claim 20, wherein said one or more circuits approximate said argument of said complex quantity by an arbitrary numerical method.

* * * * *